United States Patent
Schuehmacher et al.

(10) Patent No.: US 6,966,395 B2
(45) Date of Patent: Nov. 22, 2005

(54) SNOWMOBILE WITH A TURBOCHARGED FOUR-STROKE ENGINE

(75) Inventors: Bruno Schuehmacher, Richmond (CA); Sylvain Matte, St-Denls de Brompton (CA); Louis Lefebvre, Valcourt (CA)

(73) Assignee: Bombardier Recreational Products Inc., Valcourt (CA)

( * ) Notice: Subject to any disclaimer, the term of this patent is extended or adjusted under 35 U.S.C. 154(b) by 320 days.

(21) Appl. No.: 09/987,202

(22) Filed: Nov. 13, 2001

(65) Prior Publication Data

US 2002/0084125 A1 Jul. 4, 2002

Related U.S. Application Data

(60) Provisional application No. 60/247,052, filed on Nov. 13, 2000.

(51) Int. Cl.$^7$ .............................................. B60K 13/04
(52) U.S. Cl. .................... 180/185; 180/309; 180/68.3
(58) Field of Search ................ 180/9.25, 68.3, 180/185, 180, 309, 190; 123/563

(56) References Cited

U.S. PATENT DOCUMENTS

| 3,849,086 A | * | 11/1974 | Johnson ...................... 48/189.4 |
| 3,881,455 A | * | 5/1975 | Belsanti ...................... 123/563 |
| 4,249,626 A | * | 2/1981 | Fields et al. ................ 180/68.1 |
| 4,475,617 A | * | 10/1984 | Minami et al. .............. 180/219 |
| 4,565,177 A | * | 1/1986 | Roettgen et al. ............. 123/563 |
| 4,698,761 A | * | 10/1987 | Cooper et al. ............... 364/424 |
| 4,760,703 A | * | 8/1988 | Minami et al. ............. 60/605.1 |
| 4,900,343 A | * | 2/1990 | Minami et al. ............... 55/318 |
| 4,907,552 A | * | 3/1990 | Martin ..................... 123/198 E |
| 5,152,255 A | * | 10/1992 | Fukuda ..................... 123/41.33 |
| 5,586,540 A | * | 12/1996 | Marzec et al. ............. 123/559.1 |
| 5,598,065 A | * | 1/1997 | Lakosky ....................... 315/77 |
| 5,598,820 A | * | 2/1997 | Sokoloski .................... 123/306 |
| 5,660,245 A | * | 8/1997 | Marier et al. ............... 180/190 |
| 5,846,102 A | * | 12/1998 | Nitta et al. .................... 440/1 |
| 6,089,020 A | * | 7/2000 | Kawamura .................... 60/618 |
| 6,155,374 A | * | 12/2000 | Uchida ....................... 180/309 |
| 6,176,082 B1 | * | 1/2001 | Shaffer ........................ 60/321 |
| 6,216,809 B1 | * | 4/2001 | Etou et al. ................. 180/68.3 |
| 6,234,263 B1 | * | 5/2001 | Boivin et al. ............... 180/184 |
| 6,286,480 B1 | * | 9/2001 | Chen et al. ................. 123/380 |
| 6,293,264 B1 | * | 9/2001 | Middlebrook ............... 123/563 |
| 6,390,869 B2 | * | 5/2002 | Korenjak et al. ............. 440/88 |
| 6,415,759 B2 | * | 7/2002 | Ohrnberger et al. ........ 123/195 |
| 6,454,037 B1 | * | 9/2002 | Atsuumi et al. ............ 180/190 |
| 6,508,211 B1 | * | 1/2003 | Asano ........................ 123/41.1 |
| 6,510,912 B1 | * | 1/2003 | Atsuumi ..................... 180/69.1 |
| 6,547,021 B1 | * | 4/2003 | Kai et al. .................... 180/190 |
| 6,561,297 B2 | * | 5/2003 | Yatagai et al. .............. 180/190 |
| 6,592,415 B2 | * | 7/2003 | Berthiaume ............... 440/88 A |
| 6,651,765 B1 | * | 11/2003 | Weinzierl .................... 180/190 |
| 2002/0027029 A1 | * | 3/2002 | Yatagai et al. .............. 180/190 |

* cited by examiner

*Primary Examiner*—Matthew Luby
(74) *Attorney, Agent, or Firm*—BRP Legal Services

(57) ABSTRACT

A snowmobile is provided that includes a frame, an engine, an endless belt drive system, and an air intake system for the engine. The frame has a forward portion and an aft portion. The engine is mounted to the forward portion and the belt drive system is mounted to the aft portion and is operatively connected to the engine. The engine is a turbocharged four-stroke type engine.

29 Claims, 16 Drawing Sheets

SNOWMOBILE WITH A TURBOCHARGED FOUR-STROKE ENGINE

This application claims priority to U.S application Ser. No. 60/247,052, filed Nov. 13, 2000.

FIELD OF THE INVENTION

The present invention relates, generally to snowmobiles, and more particularly, to a snowmobile with a turbocharged four-stroke engine.

BACKGROUND OF THE INVENTION

Snowmobiles have traditionally used two-stroke type engines for power generation. Two-stroke type engines generally provide relatively high power-to-weight and power-to-size ratios, which are extremely desirable characteristics in an engine for a snowmobile. Other highly desirable characteristics of two-stroke engines in regards to snowmobiles include the relative simplicity of these types of engines and the relative ease of integration with systems, aided by the relatively high power-to-weight and power-to-size ratios of these engines.

However, recently there has been a trend to decrease exhaust emissions from internal combustion engines, especially two-stroke engines, due to environmental concerns and an increase in regulations related thereto. Generally, two-stroke engines inherently have higher exhaust emissions than their four-stroke counterparts due to: 1) the necessity of opening the exhaust ports subsequent to complete ignition of the fuel/air mixture, 2) unburned fuel escaping the exhaust port during the intake charging of the cylinder, and 3) lubrication oil mixing with the intake charge.

Lower emissions-producing four-stroke engines have generally not been used with snowmobiles due to the relatively lower power-to-weight/size ratios of these types of engines. Snowmobile performance is extremely sensitive to increases in weight and the relative compact chassis and body of a snowmobile limits the space available for the engine. Additionally, four-stroke engines can be relatively more difficult to integrate into vehicles, such as a snowmobile, due to the engine's relative complexity.

It is known outside the art of snowmobiles to use a turbocharger in conjunction with a four-stroke engine to increase the power output and fuel efficiency of the engine. However, a turbocharged V-twin engine has not previously been considered feasible for utilization with a snowmobile.

SUMMARY OF THE INVENTION

The present invention avoids these limitations in the prior art by providing a snowmobile comprising a frame, an engine, an endless belt drive system and an air intake system for enhancing performance of the engine. The frame of the snowmobile has a forward portion, with the engine mounted thereto, and an aft portion. The belt drive system is mounted to the aft portion of the frame and is operatively connected to the engine.

The engine is a four-stroke type with at least one cylinder arranged in an inline or V-twin configuration. Each cylinder includes a respective combustion chamber and the engine has an air inlet and an exhaust outlet communicating with each of the combustion chambers.

The snowmobile of the present invention further comprises an air intake system including an air box communicating with the atmosphere. The air box is a substantially hollow enclosed structure. A turbocharger is connected to the air box such that air from the air box may enter the turbocharger. The turbocharger communicates with the exhaust outlet and is constructed and arranged such that a flow of exhaust gases from the exhaust outlet through the turbocharger affects a pressurization of air therein. The pressurization of the air within the turbocharger relatively increases the temperature of the air therein. The pressurization amplitude of the air pressurized within the turbocharger is cyclical in amplitude with respect to a cyclical flow of exhaust gases thereto from the exhaust outlet. A heat exchanger formed of a heat conductive material is connected to the turbocharger such that the pressurized air from the turbocharger may enter therein. The heat exchanger is constructed and arranged such that heat from the pressurized air is dissipated therefrom to the atmosphere via the heat conductive material. A plenum is connected to the heat exchanger such that air from the heat exchanger may enter the plenum. The plenum is also connected to the air inlet and is constructed and arranged such that the cyclically pressurized amplitude of the air from the turbocharger via the heat exchanger may collect therein such that the pressurization amplitude of the air upon exiting the plenum and entering the air inlet is moderated.

Other aspects, features and advantages of the present invention will become apparent from the following detailed description, the accompanying drawings, and the appended claims.

DETAILED DESCRIPTION OF THE INVENTION

Figure 1:
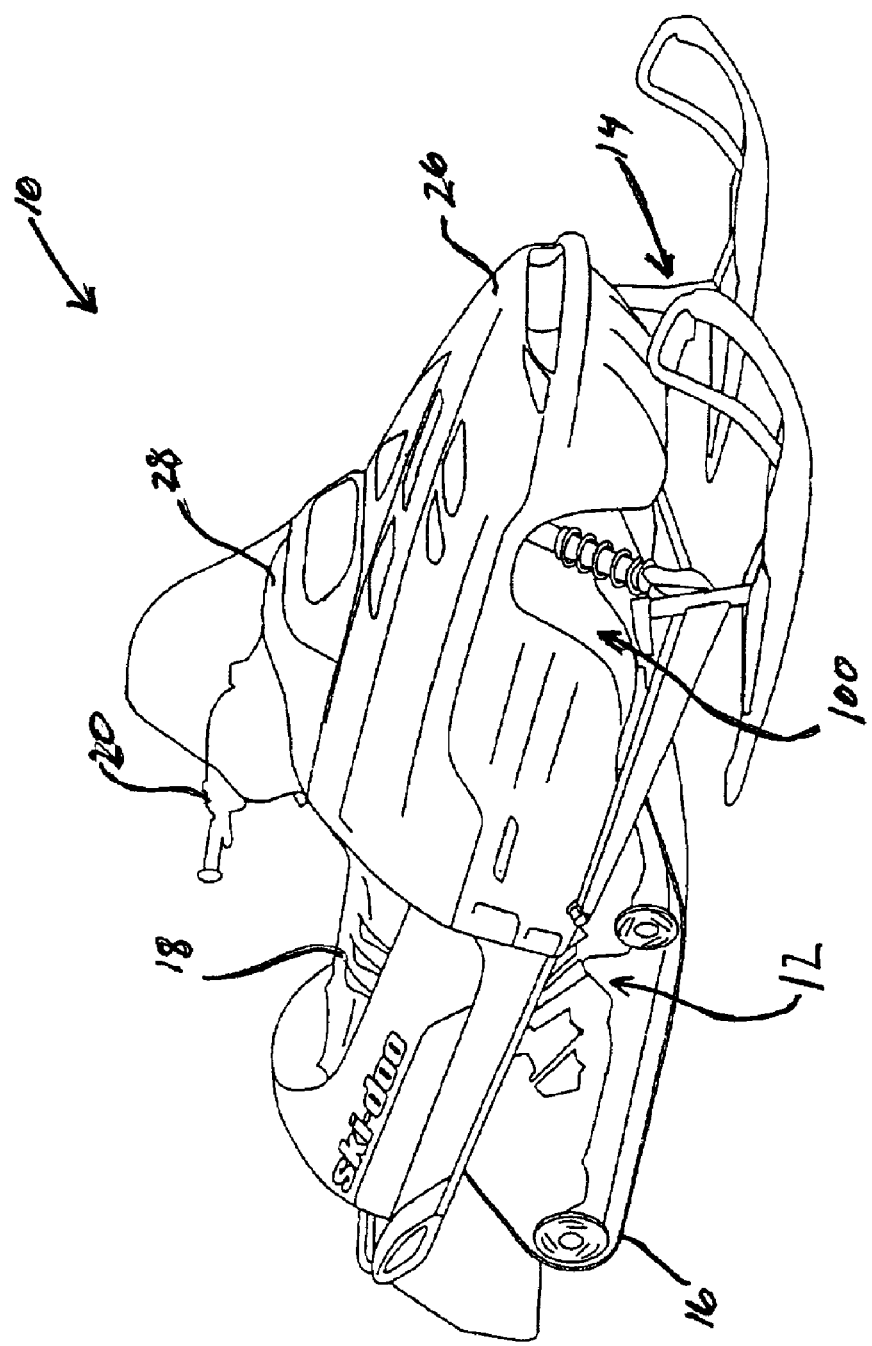
FIG. 1 is a perspective view of a snowmobile embodying the principles of the present invention.

FIG. 1 shows a snowmobile 10 embodying the principles of the present invention. As shown, snowmobile 10 has a tunnel or frame 12, a steering assembly 14 and an endless belt drive system 16 mounted to an aft end portion of the frame 12. Snowmobile 10 utilizes an internal combustion engine indicated at 100 to provide power generation thereto. Engine 100 is operatively connected to the belt drive system 16 to provide movement of the snowmobile 10. The snowmobile 10 additionally includes a seat 18 whereon a driver and rider may be positioned in a seated manner thereon. A steering control assembly 20 is located forward of the seat 18 and is operatively coupled to steering assembly 14 so as to provide a steering capability to snowmobile 10.

It is preferable for the engine 100 of the present invention to be a four-stroke type internal combustion engine. Advantages of this type of engine, as will be described herein below, include lower hydrocarbon emissions. However, several characteristics of four-stroke engines have previously rendered this type of engine unfeasible for use in a snowmobile. As such, the present invention is also directed toward an air intake system for the snowmobile 10 with a four-stroke engine.

Figure 2:
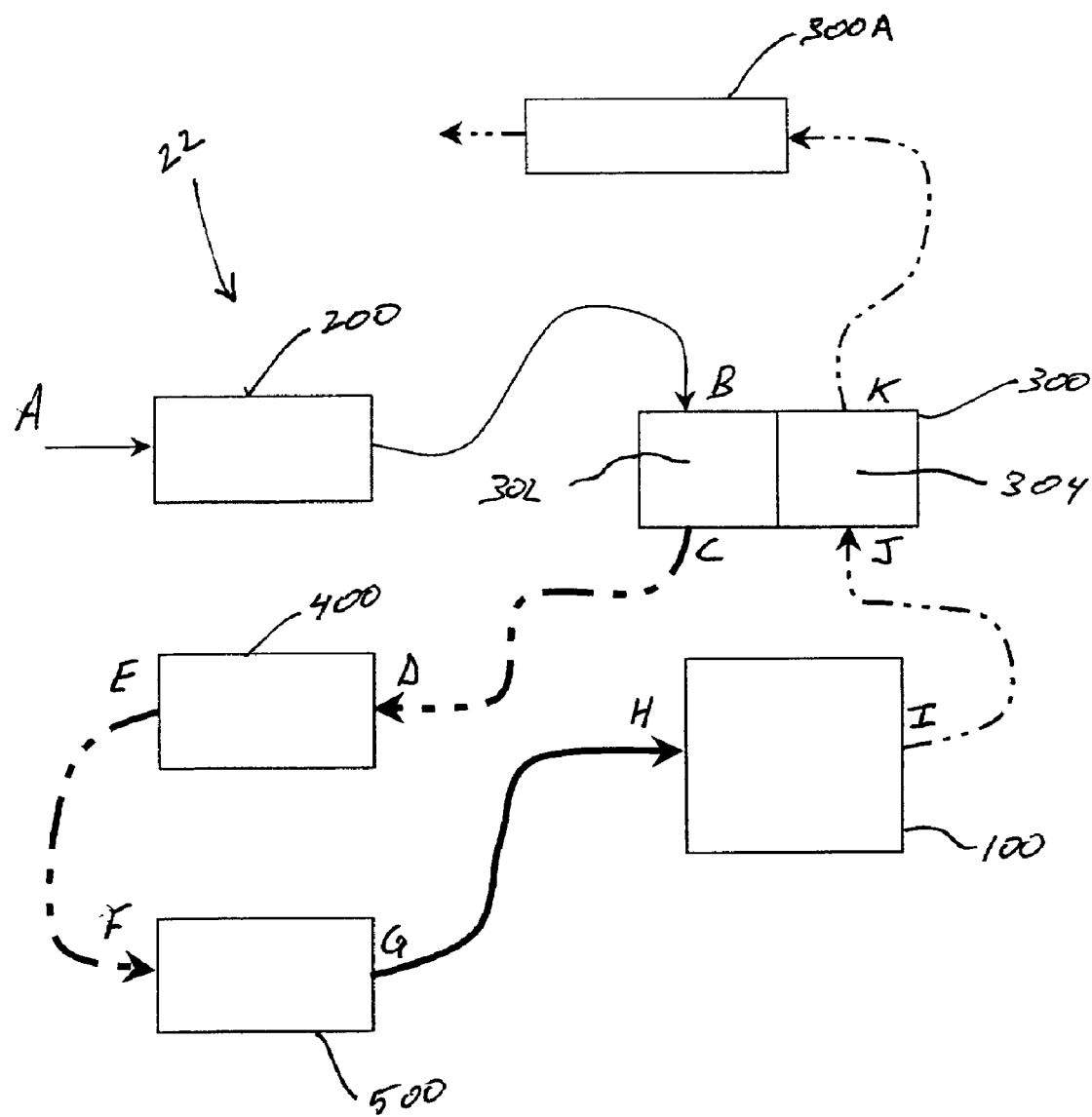
FIG. 2 is a schematic view of the air intake system of the present invention showing relative gas pressures with bold lines.

An air intake system of the present invention is shown schematically in FIG. 2 at 22. As shown in FIG. 2, air from the atmosphere enters an air box or passage 200 at A, flows therethrough and enters a turbocharger 300 at B. Within the turbocharger 300, the air is pressurized, as well as heated due to the rapid pressurization and heat conduction from the engine's exhaust such that at an exit point C the temperature and pressure of the air exiting the turbocharger 300 are greater than a pressure and temperature of the air entering the turbocharger at B. The heated and pressurized air then flows to an entrance D of a heat exchanger 400 (commonly referred to as an intercooler). The heat exchanger 400 is constructed and arranged to remove heat from the pressurized air such that at an exit point E, the temperature of the air is less than the temperature of the air at the entrance point D. As will be described below in more detail, the turbocharger 300 additionally adds a pulsed amplitude signature to the air being pressurized (and heated) therein. Upon exit from the heat exchanger at E, the air then flows to an entrance F of a plenum 500. The plenum 500, as will be described below, forms a voluminous enclosure that significantly reduces the pulsed signature from the amplitude of the pressurized air. The pressurized air then exits the plenum at G and enters the internal combustion engine at H. Further shown in FIG. 2, exhaust gases exit the internal combustion engine 100 at I and enter the turbocharger 300 at J. As will be described below, the exhaust gases entering the turbocharger 300 affect the compression of the air entering the turbocharger 300 at B, as well as introduce the pulsed nature of the pressurized air exiting the turbocharger at C. The exhaust gases then exit the turbocharger 300 at K and exit the snowmobile through an exhaust system 24 described below.

Figure 3:
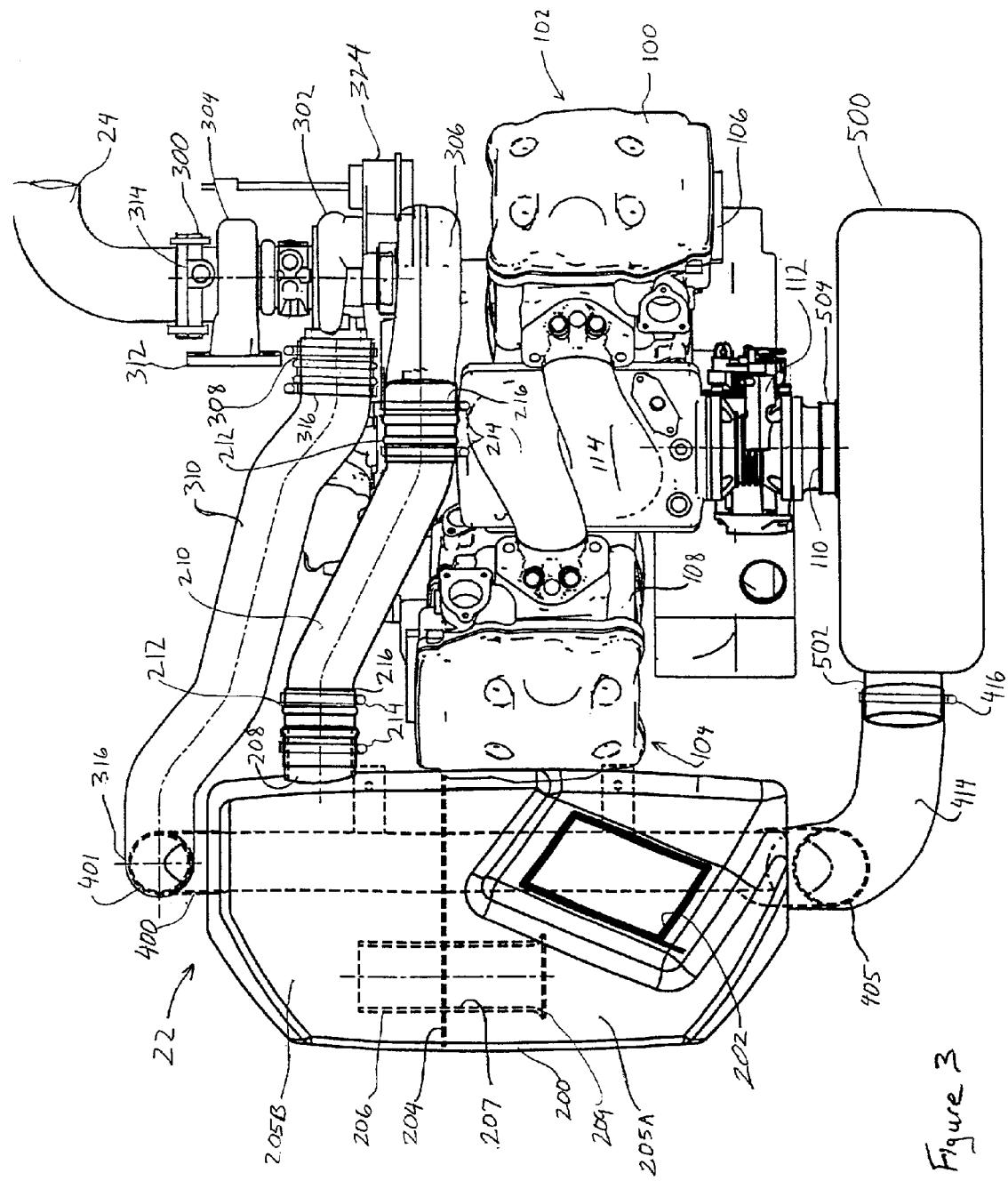
FIG. 3 is a schematic view of one embodiment of the engine and air intake system of the present invention.

FIG. 3 shows an exemplary arrangement of the air intake system 22 shown in FIG. 2. As shown, air box 200 is situated proximate a forward end 26 of snowmobile 10 and is mounted to a forward portion thereof. The air box 200 is shown relatively forward of engine 100 and adjacent thereto. In the illustrated embodiment shown in FIG. 3, the turbocharger 300 is positioned on a starboard side of the engine 100 and adjacent thereto. Shown in FIG. 3, the heat exchanger 400 is positioned at the forward end 26 beneath the air box 200. The plenum 500 is located on a port side of the engine 100 and is operatively connected thereto.

As shown in FIG. 3, air box 200 is essentially a hollow voluminous structure. The air box 200 includes an inlet 202, which communicates with the atmosphere surrounding the snowmobile 10. It is preferable for the air box 200 to include one or more interior walls 204 that divide the interior periphery of the air box 200 into two or more chambers. FIG. 3 shows two such chambers, indicated at 205A and 205B. It is preferable for the chambers 205A and 205B to be interconnected by one or more baffles 206 such that air may flow through the inlet 202 through the baffle 206 and exit the air box 200 from an outlet 208. The baffle 206, as illustrated, may be in the form of a tubular member protruding through the interior wall 204 providing an air path 207 therethrough. It is noted that the baffle 206 may also be in the form of an opening within the interior wall 204 providing the air path 207 therethrough. It is contemplated that each chamber of the air box 200 may communicate with adjacent chambers by one or more baffles 206. It is noted that the baffles 206 are preferable to reduce intake roar from the engine. The baffles 206 should be configured so as to minimize flow resistance of the air traveling therethrough. It is contemplated that by increasing the breadth of the air path 207 within each baffle, flow resistance may be reduced. It is further contemplated that a flared portion 209 may be formed on the incoming air side of each baffle to reduce flow resistance of air through the baffles. A duct member or conduit 210 extends from outlet 208 to the turbocharger 300.

Figure 4:
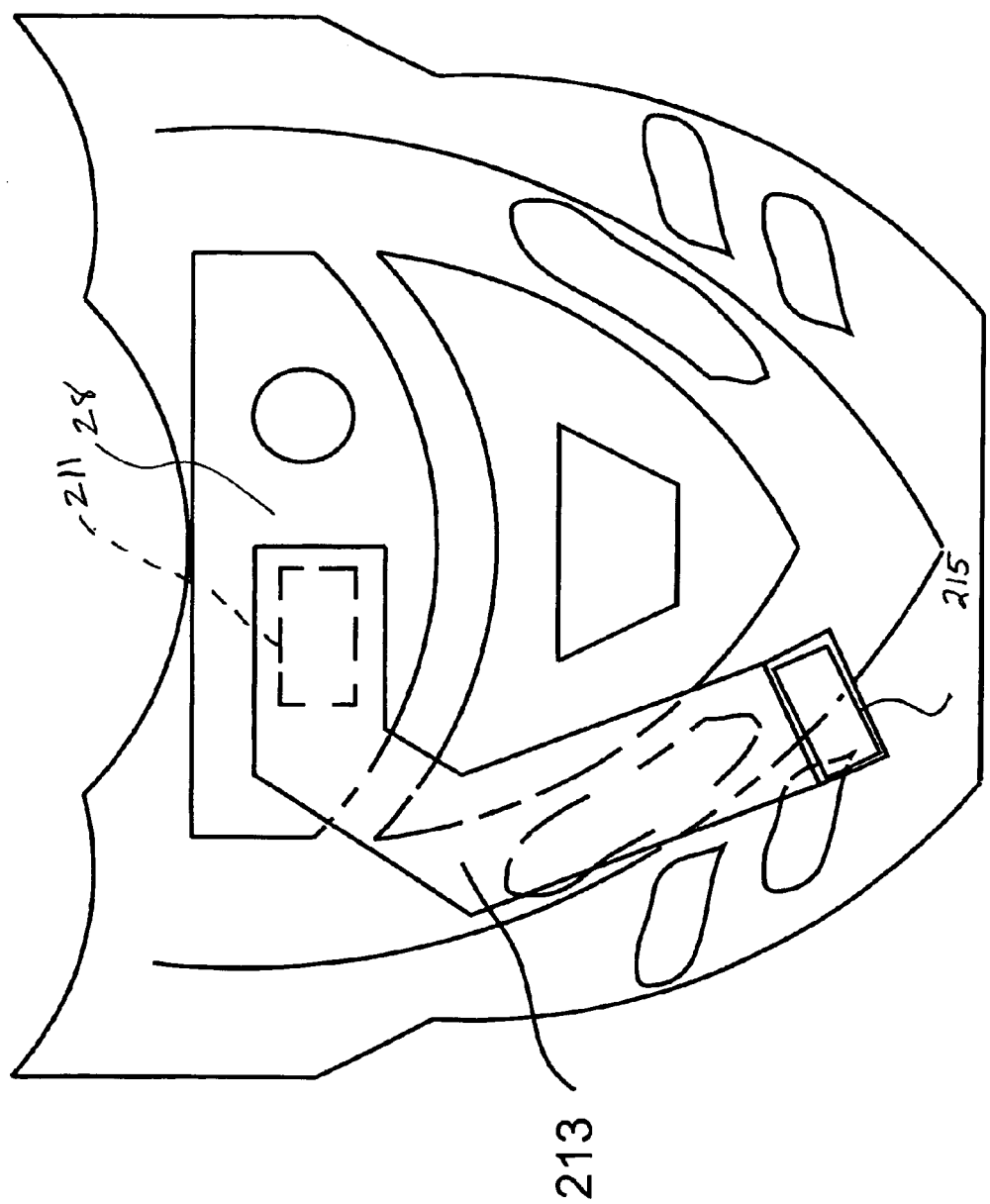
FIG. 4 is a bottom plan view of an upper portion of the snowmobile shown in FIG. 1.

It is preferable for the inlet 202 to be positioned as far as possible from the engine 100 and exhaust system 24, such that the coolest air possible may be allowed to enter the inlet 202. For this reason, and to prevent the intake of snow, an inlet opening 211 (shown in FIG. 4) may be located within an upper portion 28 of the snowmobile 10 (shown in FIGS. 1 and 4) proximate the steering control assembly 20. It is contemplated that for the embodiment illustrated in FIG. 3, the inlet 202 of the air box 200 may communicate with the inlet opening 211 with a heat-shielded duct or conduit shown in FIG. 4 at 213. The shielded duct 213 allows cool atmospheric air to travel from the vent structure to the inlet 202 without gaining significant heat from the engine 100 and exhaust system 24. As shown in FIG. 4, it is preferable for a seal 215 to be provided between the duct 213 and the inlet 202 to prevent air leakage therebetween. It is also contemplated, however that the air box 200 may be positioned aft of the engine 100 such that the inlet 202 may directly communicate with the inlet opening 211 or such that a relatively shorter length of heat-shielded duct 213 may be necessary. A filter (not shown) may be positioned at inlet 202 or the inlet opening 211 within the air flow to screen or prevent particles from entering the air box 200.

As shown in FIG. 3, the turbocharger 300 communicates with the outlet 208 of the air box 200 via conduit 210. Conduit 210 is preferably a rigid metallic tubular member with a configuration that allows a relatively direct path from the outlet 208 to the turbocharger 300. It is contemplated that the configuration of the conduit 210 may include one or more bends to accommodate positioning of various engine or snowmobile components and the relative positions of the outlet 208 and turbocharger 300. It is also contemplated that the conduit 210 may have a flexible metallic configuration or may be formed of plastic material. However, due to the heat present at the relative proximity of the engine 100, it is preferable for the conduit 210 to be relatively resistant to high-heat environments. As shown in FIG. 3, the conduit 210 is secured at each end to the outlet 208 and the turbocharger 300 with a fastening device 212.

Figure 5:
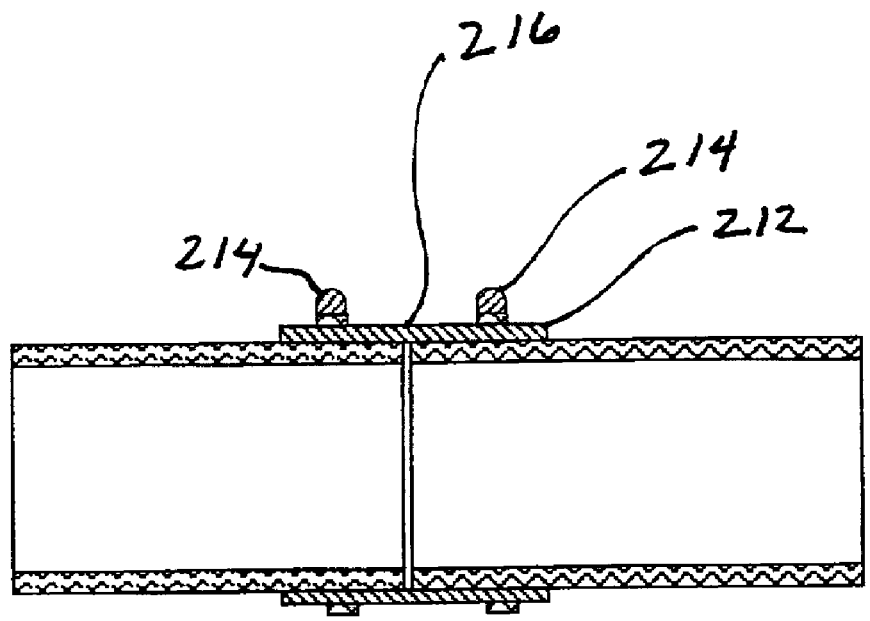
FIG. 5 is a sectional view of a fastening device.

FIG. 5 shows the fastening device 212 in more detail. As shown, the fastening device 212 may include one or more circular clamps 214 and a flexible member 216. The flexible member 216 has a configuration that allows it to be disposed around the outlet 208 on one end and an associated end portion of the conduit 210 on an opposite end. The circular clamps 214 are then secured around the flexible member 216 proximate each end thereof to thereby secure the flexible member 216 to each of the outlet 208 and the conduit 210. It is preferable for the fastening device 212 to include the flexible member 216 to allow relative vibrational movement between each of the outlet 208, conduit 210 and the turbocharger 300 to prevent fatigue stress and possible cracking of any of these parts or the fastening device 212 itself, as may occur with a rigid connection at these points due to vibrations caused by the engine 100 and movement of the snowmobile 10.

Figure 6:
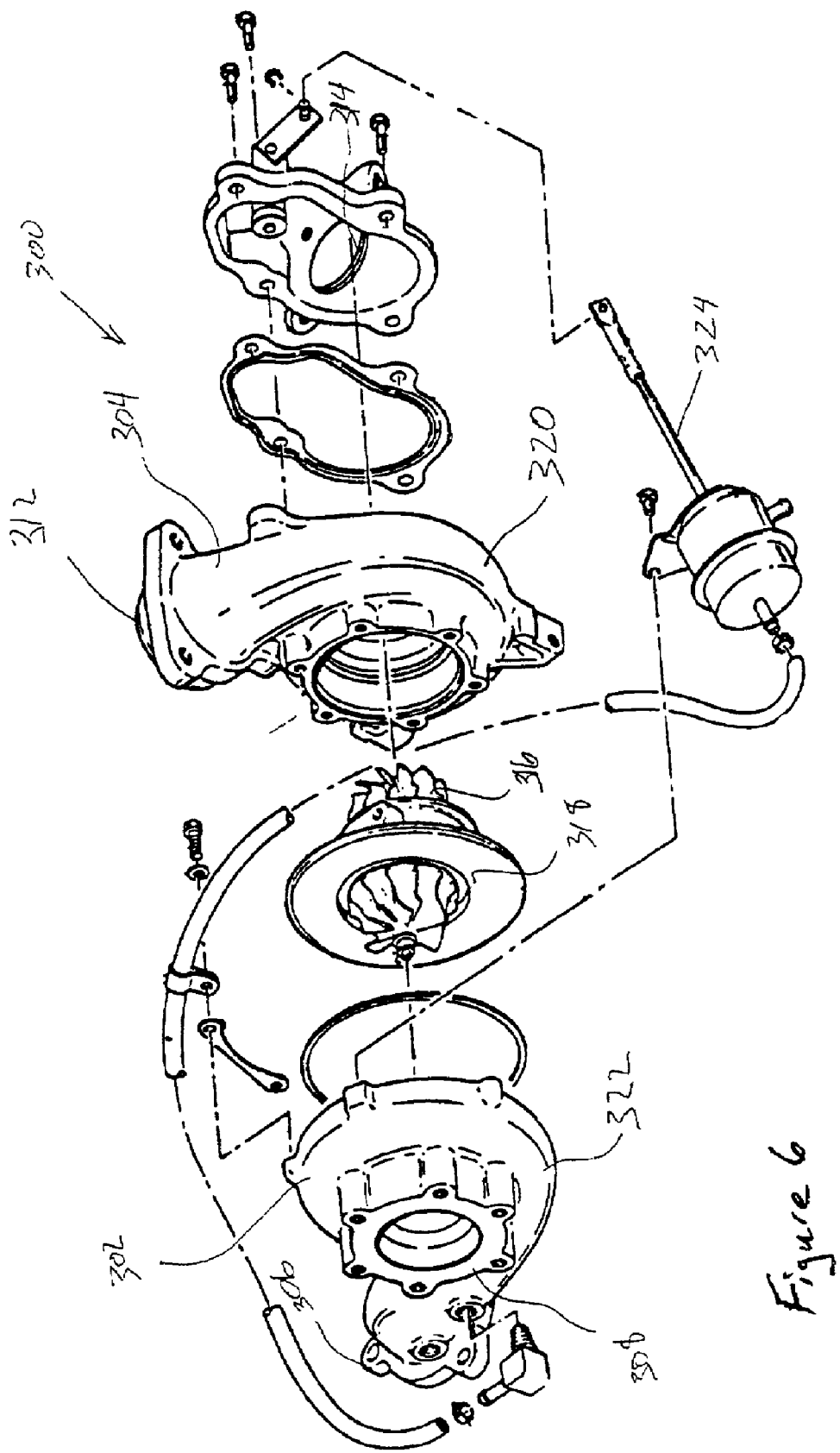
FIG. 6 is an exploded view of one type of turbocharger.

Referring back to FIG. 3, the turbocharger 300 includes a compressor portion 302 and a turbine portion 304. The compressor portion 302 has an inlet 306 which is connected to conduit 210, as described above, and has an outlet 308 that is connected to a duct or conduit 310, similarly to the connection between the conduit 210 and the inlet 306. Turbine portion 304 includes an inlet 312 and an outlet 314. As stated previously, the turbocharger 300 utilizes energy provided by the exhaust (generated by the engine 100) to compress (pressurize) air from the atmosphere. FIG. 6 shows one type of turbocharger that may be used for the intake system 22. As shown, a turbine structure 316 is connected to a compressor structure 318. For the type of turbocharger shown in FIG. 6, turbine structure 316 and compressor structure 318 are integral. However, it is noted that any other type of turbocharger may be used, including types that have separate turbines and compressors that are linked, for example by a rigid shaft that extends therebetween.

For the turbocharger shown in FIG. 6, the turbine structure 316 is connected to compressor structure 318 so as to rotate in unison therewith. A turbine housing 320 is configured to direct the exhaust gases from the engine onto the turbine structure 316 in a tangential direction to produce rapid rotational movement thereof. The exhaust gases are then expelled from the turbine portion 304 through outlet 314 and flow into the exhaust system 24. As the turbine structure 316 rotates, the compressor structure 318 rotates simultaneously therewith. A compressor housing 322 cooperates with the compressor structure 318 to draw air from the air box 200 into the compressor portion 302. The compressor structure 318 is configured to compress the air within the compressor portion 302 and directs the pressurized air out of the compressor outlet 308.

A waste gate, or bypass valve 324, shown in FIGS. 3 and 6, is operatively linked to turbine housing 320. The turbine housing 320 provides an alternate flow path from the turbine inlet 312 to the turbine outlet 314, while the waste gate 324 allows a predetermined volume of exhaust gas to bypass the turbine structure 316 from the turbine inlet 312 and discharge out of the turbine outlet 314, thereby both reducing the pressure output of the turbine portion 302 and decreasing the amount of back pressure between the engine 100 and the turbocharger 300. As such, the speed of the turbine structure 316 and the amount of pressurized air being discharged from the turbine portion 302 may be altered for any state of engine operation. The waste gate 324 is adjustable to allow for varying amounts of exhaust to bypass the turbine structure 316 for varying performance needs of the engine.

The benefits of the use of turbocharger 300 in conjunction with the engine 100 include enhanced performance and improved efficiency. As the pressurized air exiting the compressor portion 302 is denser than the unpressurized air entering the compressor portion 302, a given volume of the pressurized air includes a larger quantity of oxygen than a given volume of the non-pressurized air. A larger volume of oxygen present in the combustion chamber of the engine 100 upon ignition facilitates combustion of a greater amount of fuel, thereby minimizing unburned fuel exiting with the exhaust and increasing the power output-to-fuel input ratio of the engine. However, as the turbine structure 316 is directly linked to the compressor structure 318, the compressor structure 318 induces cyclical pressurization of the air which produces a series of high amplitude pressure peaks (high pressure magnitude) coinciding with the exhaust strokes of the cylinders and a series of low amplitude pressure troughs (low pressure magnitude) coinciding with the intake, compression and power strokes of the cylinders. Therefore, the engine configuration (i.e. the timing of the exhaust strokes of the cylinders) determines the pressurization cycle of the air exiting the compressor portion 302. For example, during the exhaust strokes of the engine 100, a high pressure exhaust gas pulse is delivered to the turbine portion 304. Consequently, the rotational velocity of the turbine structure 316 is increased in proportion to the amplitude of the exhaust pulse and a high amplitude intake air pressure pulse is generated by the compressor portion 302. Conversely, during the remaining strokes (intake, compression and ignition) a relatively low pressure exhaust gas flow is delivered to the turbocharger 300, producing low pressure amplitude intake air.

Furthermore, during low speed engine operation, the exhaust strokes of the engine occur relatively slowly and, as such, the frequency of the high amplitude pressure peaks produced by the compressor portion 302 is relatively lower. Upon rapid throttle advancement, such as at rapid takeoff from idle or during maneuvering, the generation of high amplitude pressure peaks "lags" due to the time required for the increased exhaust pressure (from the increased combustion rate of the engine) to spin-up (rotate synchronously with the exhaust gases from the engine 100) the turbine structure 316. Subsequently, increased air flow demands from the engine 100 are not met by the compressor portion 302 and as such, the power increase from the turbocharger 300 is not available. Additionally, as the turbine structure 316 may be rotating insufficiently to displace the increased amount of exhaust gases produced from the engine 100, back pressure may be produced between the engine 100 and the turbine portion 304, which may actually decrease the amount of power the engine 100 generates until the turbine structure 316 spins-up. Resistance of the turbine structure 316 to spin-up is caused by the force exerted on the increased volume of air being compressed in the compressor portion 302 and the force of suction from the resistance of the air from the air box 200.

As shown in FIG. 3, the compressor outlet 308 communicates with the intercooler 400 by a duct or conduit 310. Conduit 310 is connected on one end to the compressor outlet 308 and is connected on an opposite end to an inlet port 401 of the intercooler by a pair of fastening devices 316, similar to fastening device 216. As with conduit 210, conduit 310 is preferably formed from a heat resistant material, such as metal or heat resistant plastic and is configured to provide a relatively direct air path between the turbocharger 300 and the intercooler 400.

Figure 7:
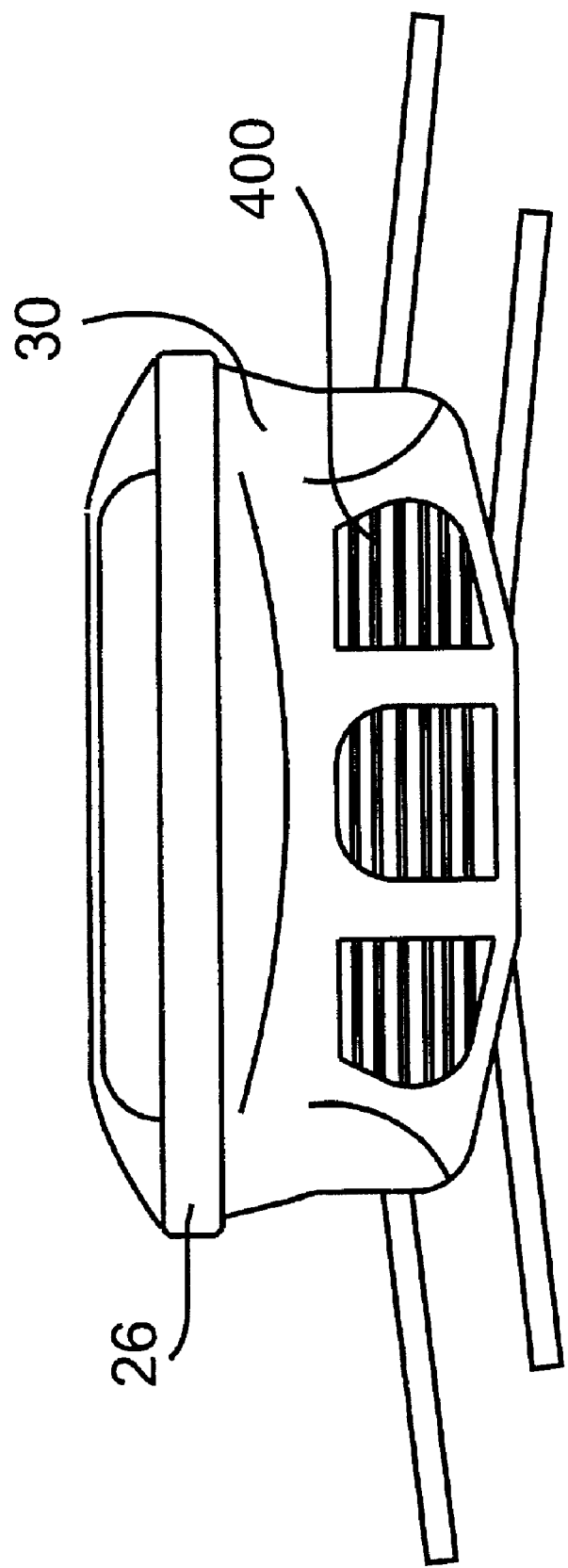
FIG. 7 is a front plan view of the forward portion of the snowmobile shown in FIG. 1.
Figure 8:
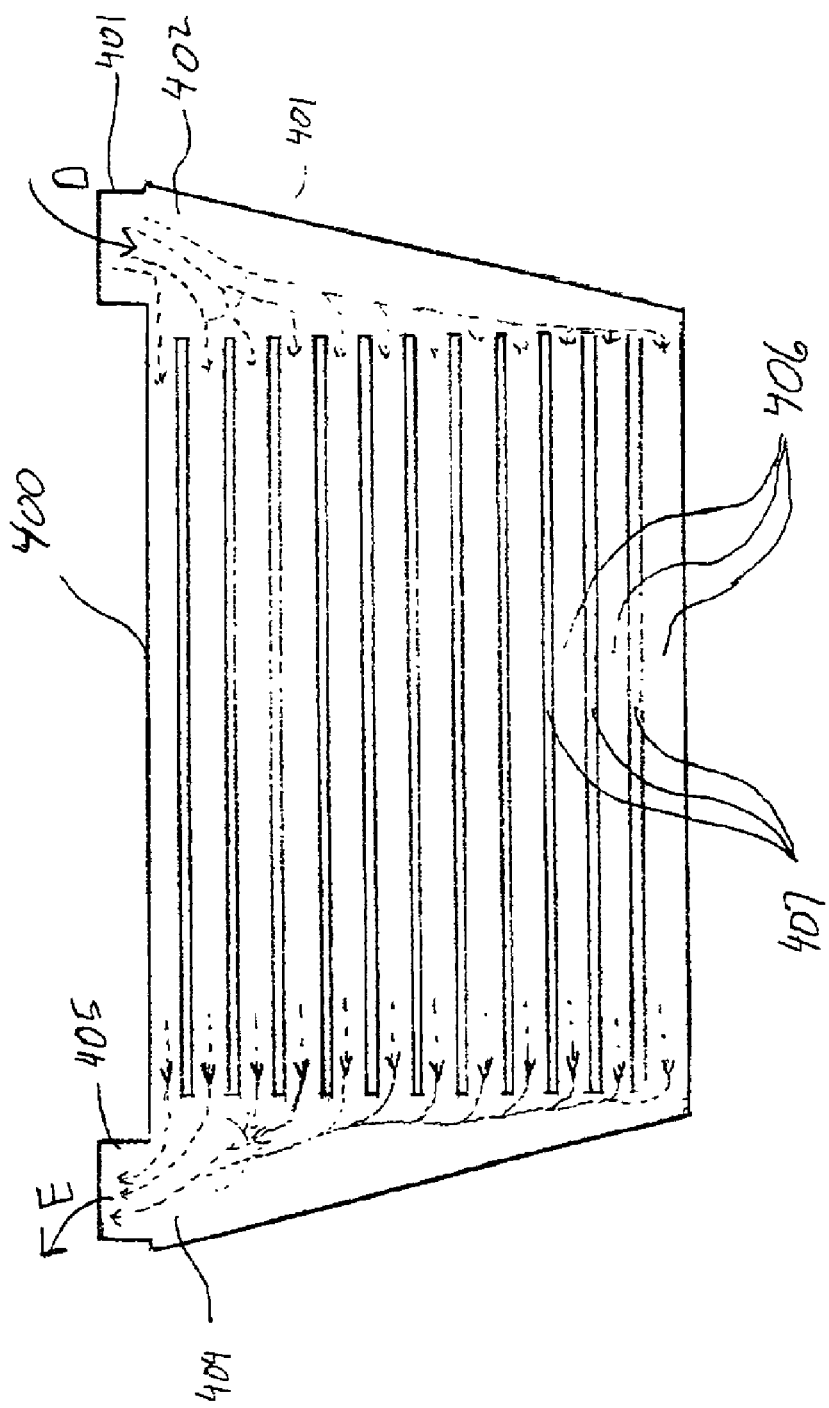
FIG. 8 is a front elevational view of the heat exchanger showing pathways of air flow therethrough in phantom.

FIG. 7 shows one embodiment of the heat exchanger 400 as being located proximate the forward portion 26 of snowmobile 10 in a vertical position. As stated previously, the heat exchanger 400 is constructed and arranged to dissipate heat from the pressurized air exiting the turbocharger 300. As shown in FIG. 8, the heat exchanger 400 includes an intake portion 402, which provides inlet port 401, and an outlet portion 404, which provides an outlet port 405. The intake and outlet portions 402, 404 are interconnected by a spaced series of elongated conduits 406. As shown in FIG. 8, air from the turbocharger 300 enters through the inlet port 401 of intake portion 402 from conduit 310. The air is directed through the series of conduits 406 toward the outlet port 405. It is preferable for the heat exchanger 400 to be formed of a heat conductive material such as metal, for example, aluminum or steel. The heat conductive material of the conduits 406 allows heat from the air flowing therein to dissipate therethrough and into the atmosphere. It is preferable for the wall thickness of the conduits 406 to be relatively thin to expedite the heat dissipation. It is also preferable for the conduits 406 to be configured so as to minimize air flow resistance and pressure loss of the air flowing therein, such as with relatively large breadth cross-sectional geometries. It is also preferable for spaces 407 between the conduits 406 to be sufficiently wide so as to allow a relatively large amount of air to pass therethrough without producing significant air resistance. However, it is also preferable to keep both the cross-sectional size and distance between conduits 406 to a minimum, to maintain a space efficient design of the intercooler 400.

As shown in FIG. 7, it may be preferable for the heat exchanger to be mounted in a position that is generally normal to the movement of air produced from forward movement of the snowmobile 10. This arrangement directly exposes the conduits 406 to the flow of oncoming air, which may facilitate heat dissipation.

Figure 9:
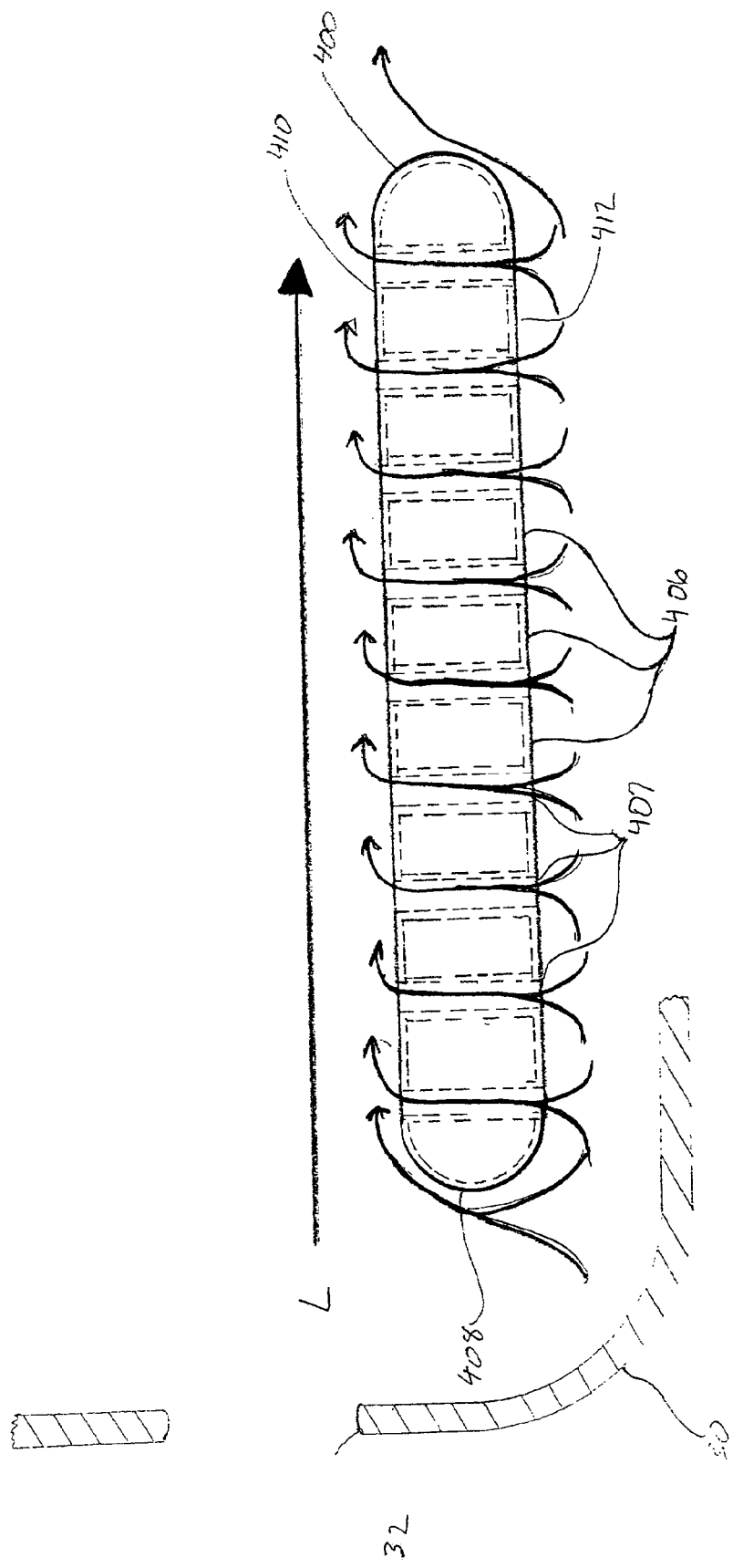
FIG. 9 is a side view of the heat exchanger in a horizontal arrangement showing air entrainment.

It is also contemplated that the heat exchanger 400 may be mounted such that it is arranged parallel to the oncoming air, when the snowmobile 10 is moving generally forwardly. As such, only a forward edge 408 of the intercooler 400 is exposed to the oncoming air. As illustrated in FIG. 9, providing air flow over an upper side 410 of the heat exchanger 400 (relative to the horizontally mounted position), such as indicated by L, produces a lower pressure relative to the upper side 410 that entrains air from below the heat exchanger 400 through the spaces 407 to liberate heat from the conduits 406. In this arrangement, a body panel, such as indicated in FIG. 7 at 30 may be provided forward of the heat exchanger 400 to protect the heat exchanger 400 from impacts with debris. An opening 32 within the panel 30 provides air flow across the upper side 410 of the heat exchanger, as prescribed above for sufficient heat dissipation. It is noted that the opening 32 may also be positioned so as to provide air flow across a lower side 412 of the heat exchanger 400 thereby entraining air from the upper side 410 toward the lower side 412 between the conduits 406.

Figure 10:
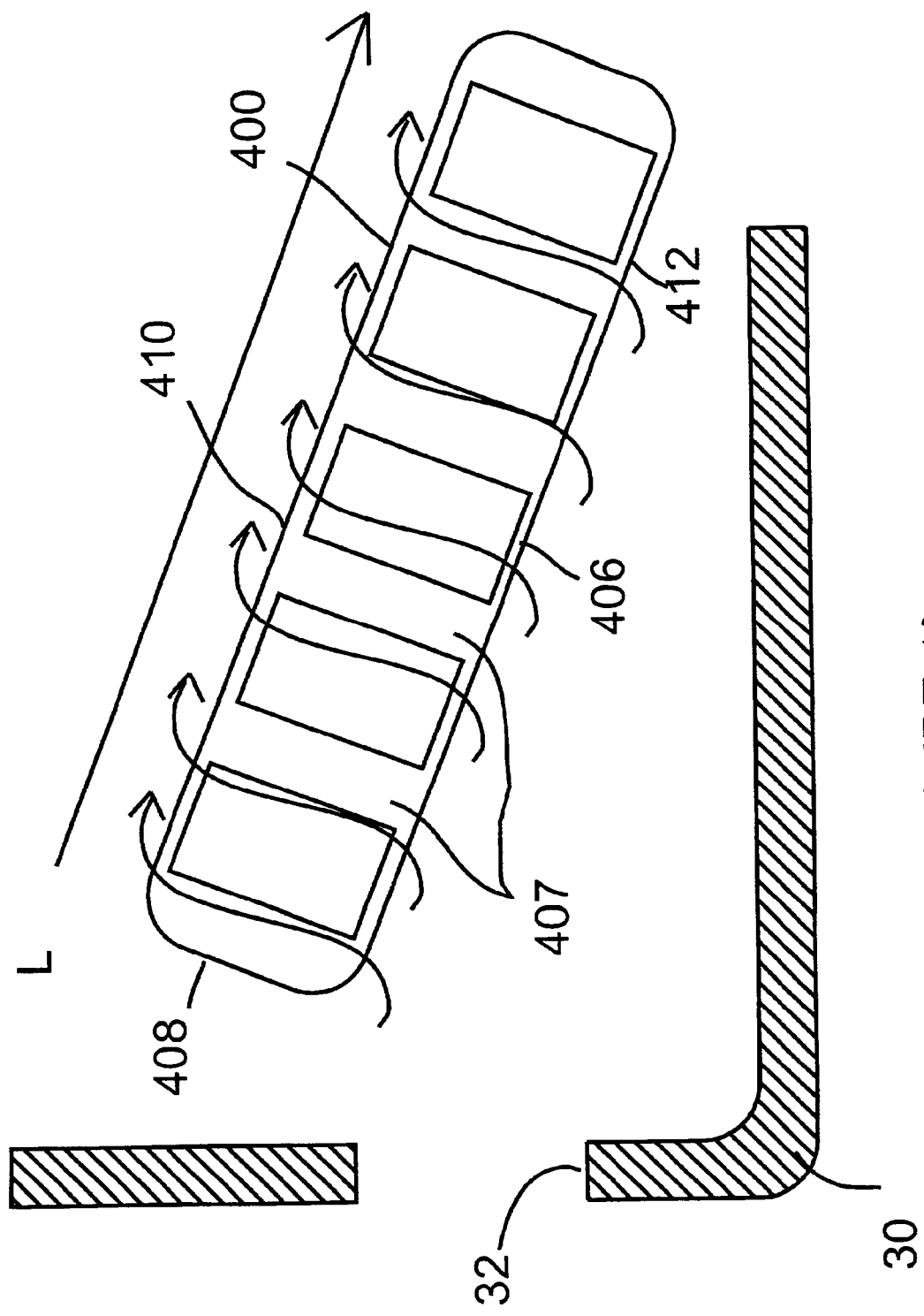
FIG. 10 is a side view of the heat exchanger in an angled arrangement showing air entrainment.

It is, of course, possible to orient the heat exchanger at any position other than parallel and normal to the flow of air. For example, FIG. 10 shows the heat exchanger 400 at about a 45° angle relative to the air flow direction.

As shown in FIG. 3, the outlet port 405 of the heat exchanger 400 communicates with the external plenum 500 via a conduit 414. It may be preferable for the conduit 414 to be formed of a polymer material, since the temperature of the air exiting the heat exchanger 400 may be relatively lower than the air entering the heat exchanger 400. A pair of clamps 416, similar to the clamps 214, may be used to secure respective ends of the conduit 414 to the outlet port 405 and the plenum 500.

As shown in FIG. 3, the plenum 500 includes an inlet port 502 and an outlet port 504. Inlet port 502 is secured to conduit 414 with the clamp 416. The outlet port 504 is communicated to the engine air intake 110. It is preferable for the plenum 500 to be connected to engine air intake 110 in a relatively direct manner, so as to minimize the air travel distance between the plenum 500 and the engine 100. It is noted that the plenum 500 may be preferably formed of a metallic material. However, it is contemplated that a rigid polymer material may also be utilized. The plenum 500 is preferably a substantially hollow enclosure, which possesses a relatively large volume.

As described previously, pressurized air from the turbocharger 300 has a cyclical pressure pattern derived from the pulses of the exhaust gases generated by the engine 100. As the frequency of the high pressure peaks of the intake air may be out of phase with the intake strokes of the cylinders, the cylinders may intake varying amounts of high density air causing erratic performance of the engine 100. Due to the large volume of the plenum 500, high pressure peaks entering the plenum 500 may be dissipated. Furthermore, the plenum 500 serves to bank a potential of relatively high pressure intake air. Due to the dissipation of the high pressure peaks and the banking of a relatively high pressure potential, the engine 100 may intake air with a relatively constant pressure amplitude.

It may be preferable for the plenum 500 to possess a volume of between and including 3 and 5 liters. It may be especially preferable for the plenum 500 to possess a volume of 3.5 liters. It is contemplated, however that the plenum 500 may be utilized with volumes below or above 3 and 5 liters. It is noted that the plenum volume may be altered with respect to engine size, engine operating characteristics, and/or turbocharger output.

The illustrated embodiment of the plenum 500 is directed to an elongated rectangular structure, as shown in FIG. 3. It is contemplated, however that any of various configurations may be utilized to perform an equivalent function. For example, a duct, hose or pipe member with a relatively large diameter (or breadth, in the case of non-circular configurations) may be utilized.

As further illustrated in FIG. 3, the engine 100 communicates with the plenum 500 at the air intake 110. The air intake 110 is preferably provided by a throttle body 112, which regulates an amount of air that enters the engine 100 corresponding to throttle position.

Figure 11:
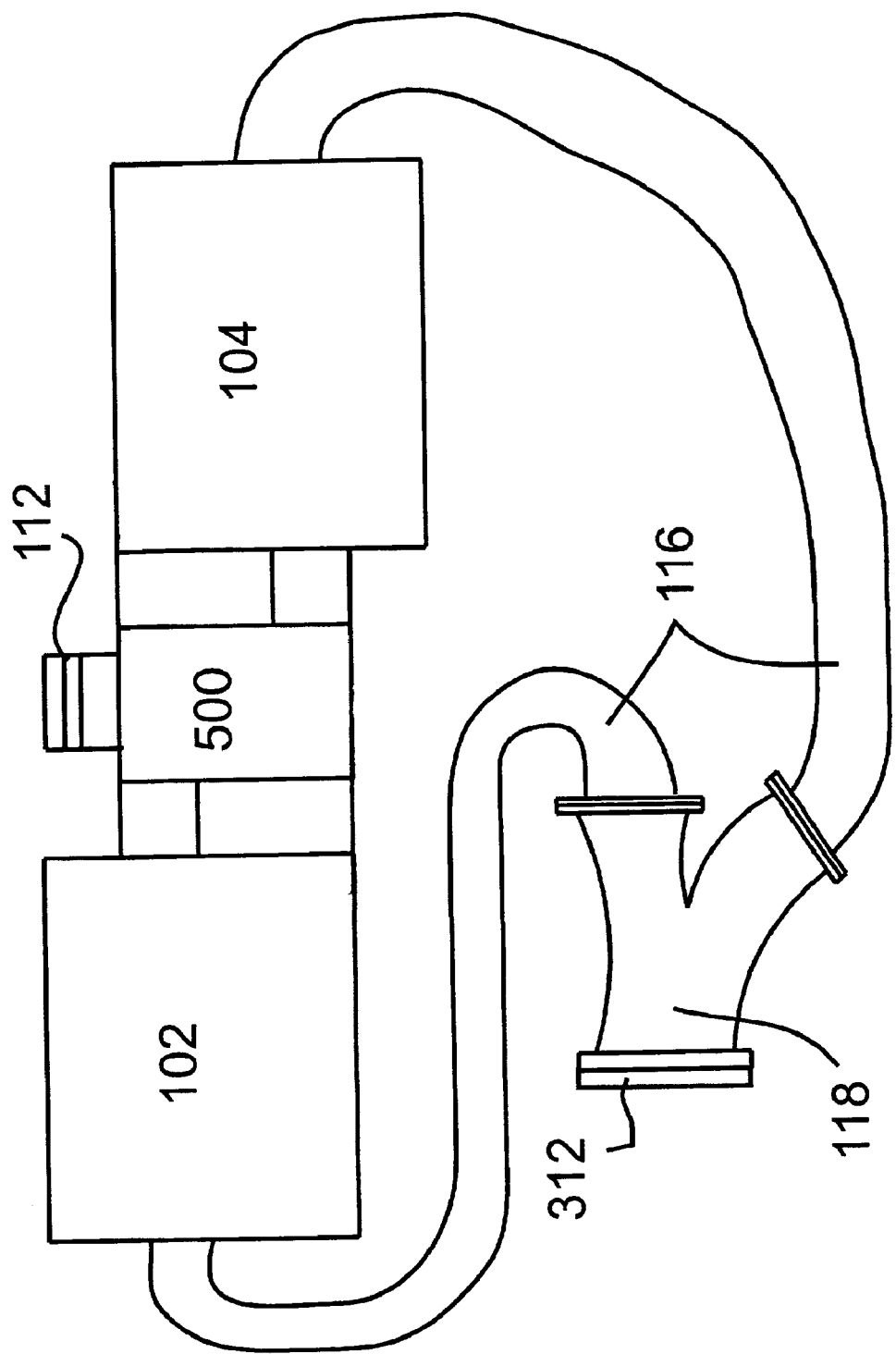
FIG. 11 is a schematic view of a V-twin engine and exhaust conduit connected thereto.

The engine shown in FIG. 3 has a V-twin configuration, which includes the cylinders 102, 104 that are angularly opposed to each other. It is contemplated that the angle between the cylinders 102, 104 may be between 180° and 0°. However, it is preferable for the angle between the cylinders 102, 104 to be between 90° and 60°. It may be especially preferable for the angle to be about 80°. It is contemplated that an angle between the cylinders 102, 104 less than 80° may require a balancer, such as a harmonic balancer, to counteract and oppose the power strokes of the cylinders 102, 104 to prevent excessive vibration of the engine 100. For this reason, it may be advantageous for the engine 100 to include the 80° angle between the cylinders 102, 104 to lower the vibrations produced by the engine and forego the balancer. The V-twin engine has the associated cylinder heads 106, 108 secured to an upper portion of each cylinder 102, 104. Each cylinder head 106, 108 has a respective plurality of valves (not shown) which includes one or more intake valves and one or more exhaust valves (not shown), each of which communicates with their associated combustion chambers (not shown). It is contemplated that the displacement of each cylinder 102, 104 be between 300 and 750 cm$^3$ (cc), corresponding to a total engine displacement of between 600 and 1500 cc, respectively. It is preferable for each cylinder 102, 104 to have a displacement of about 650 cc, corresponding to a total engine displacement of about 1300 cc. It is contemplated, however that the engine displacement may be increased or decreased due to power needs and/or space considerations of the snowmobile. Therefore, the above-described displacement values are not meant to be limiting. An integral plenum 114 provides pathways between the throttle body 112 and each cylinder head 106, 108 through which pressurized air from the plenum 500 flows to the intake valves for intake into an associated combustion chamber. Additionally, each cylinder head 106, 108 has an exhaust outlet from which exhaust gases may be expelled from the respective combustion chambers through the exhaust valves. Heat-resistant piping 116, schematically illustrated in FIG. 11, is connected to each exhaust outlet and is connected to a connecting structure 118 prior to connection to the turbine inlet 312 of the turbocharger 300. As such the exhaust gases from both cylinders are routed through the turbine portion 304 of the turbocharger 300.

The above discussion of a four-stroke V-twin engine is meant only as an example of one type of engine that may be used to power the snowmobile 10 and that may be used in conjunction with the air intake system 22 of the present invention. It is, of course, possible to use any other type of four-stroke engine with the intake system 22. For example, FIGS. 12 and 13 schematically illustrate two and three cylinder, in-line four-stroke engines, respectively at 700 and 800.

Figure 12:
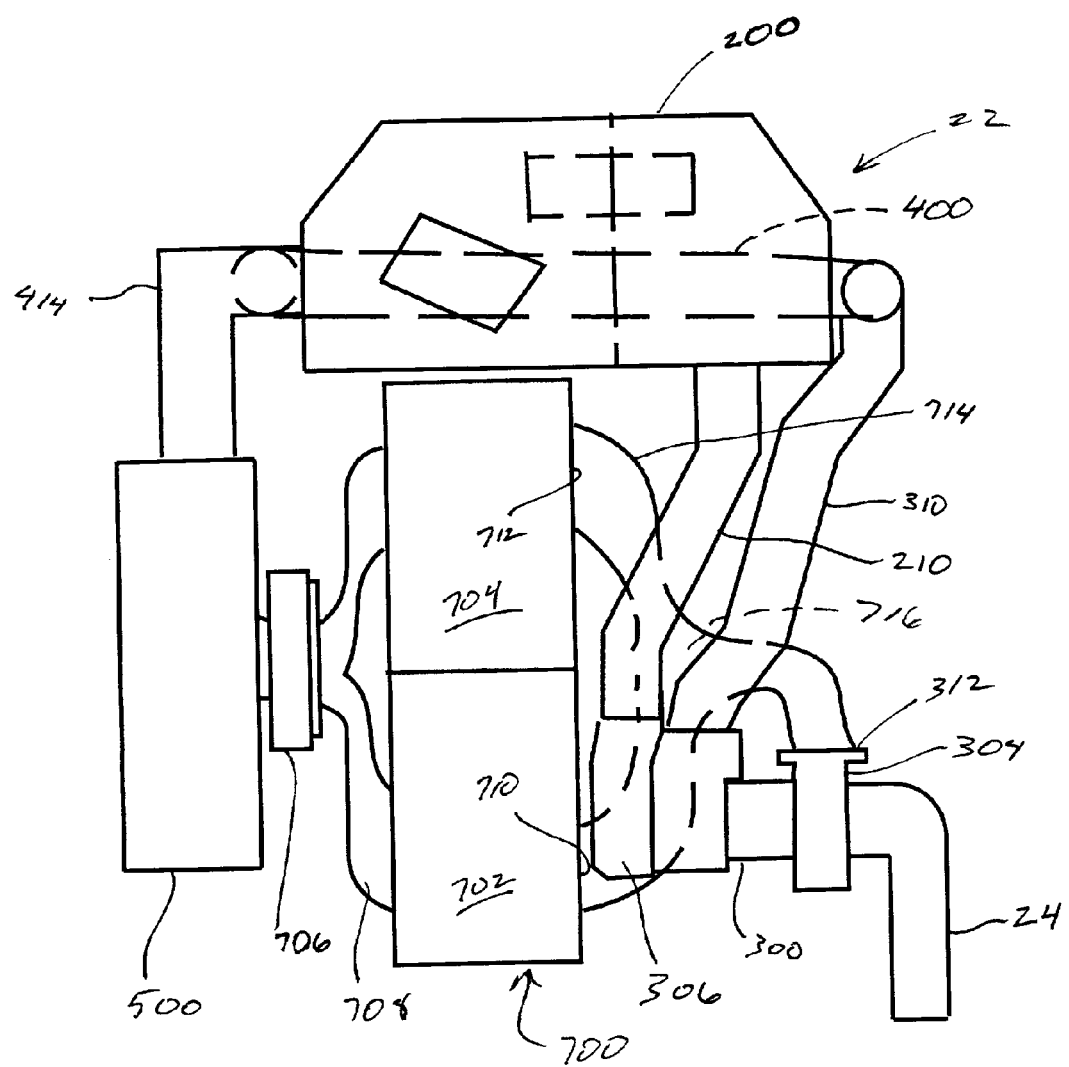
FIG. 12 is a schematic view of a two cylinder, in-line engine equipped with an air intake system and turbocharger according to the principles of the present invention.

The two cylinder engine indicated at 700 in FIG. 12 includes a pair of cylinders 702, 704 that are disposed generally in-line with one another and have pistons (not shown) housed therein, which are operatively coupled to a common crankshaft (not shown). As with the engine 100, the engine 700 is fed pressurized air from the plenum 500 via an air inlet 706, which may be provided by a throttle body or carburetor(s). As further illustrated, pressurized air is supplied to each cylinder 702, 704 by a plenum, or intake manifold, indicated by 708. Exhaust outlets 710, 712 of each cylinder 702, 704 are connected to the inlet 312 of the turbocharger 300 via exhaust conduit 714, similar to conduit 116. The exhaust conduit 714 includes a branched portion 716, which is connected to the inlet 312. In this manner, the engine 700 is supplied with pressurized air from the turbocharger 300 and powers the turbocharger 300 with exhaust gas from the exhaust outlets 710, 712.

Figure 13:
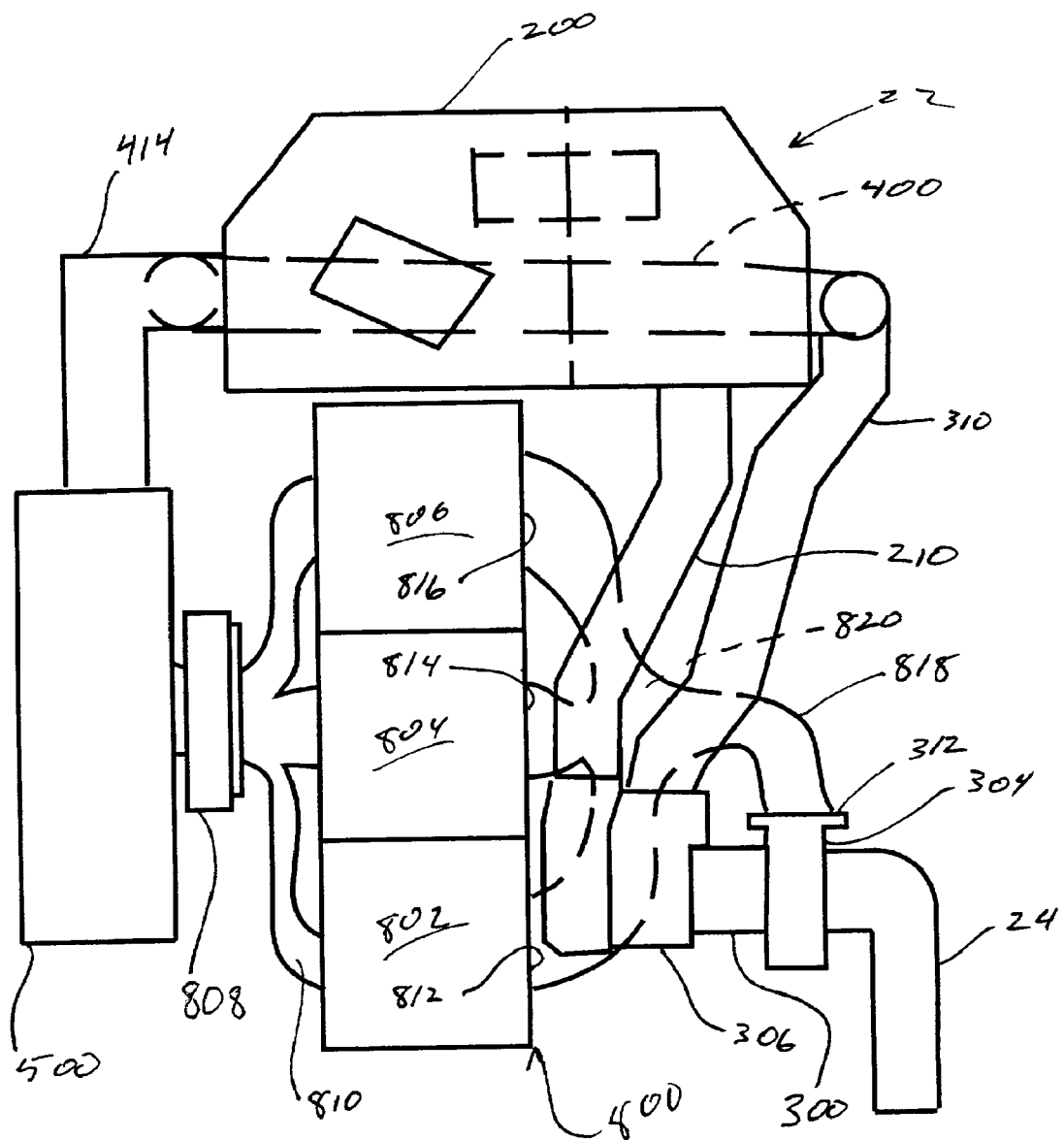
FIG. 13 is a schematic view of a three cylinder, in-line engine equipped with an air intake system and turbocharger according to the principles of the present invention.

The three cylinder engine indicated at 800 in FIG. 13 includes three cylinders 802, 804, and 806 that are disposed generally in-line with one another and have pistons (not shown) housed therein, which are operatively coupled to a common crankshaft (not shown). As with the engines 100 and 700, the engine 800 is fed pressurized air from the plenum 500 via an air inlet 808, which may be provided by a throttle body or carburetor(s). As further illustrated, pressurized air is supplied to each cylinder 802, 804, and 806 by a plenum, or intake manifold, indicated by 810. Exhaust outlets 812, 814, and 816 of each cylinder 802, 804, and 806 are connected to the inlet 312 of the turbocharger 300 via exhaust conduit 818, similar to conduits 116 and 714. The exhaust conduit 818 includes a branched portion 820, which is connected to the inlet 312. In this manner, the engine 800 is supplied with pressurized air from the turbocharger 300 and powers the turbocharger 300 with exhaust gas from the exhaust outlets 812, 814, and 816.

For the V-twin engine discussed above, exhaust gas flowing from the engine 100 is pulsed (i.e. has a cyclical pressure peak frequency) due to the firing sequence of the cylinders 102, 104. With the configuration of the cylinders 102, 104 of the V-twin engine 100, the firing sequence includes the rapid successive ignition of each cylinder 102, 104. Therefore, the exhaust strokes of the cylinders 102, 104 occur relatively close together. This arrangement produces a pair of high amplitude exhaust pressure peaks derived from the exhaust strokes of each cylinder 102, 104 followed by low amplitude exhaust pressure during the three remaining strokes (intake, compression and power strokes) of each cylinder. In other words, the exhaust pressure signature includes a pair of high pressure pulses with a lull of low exhaust pressure in-between successive exhaust strokes. As described hereinabove, consequent to the pulsed nature of the exhaust gas flow, the pressurized air generated by the turbocharger 300 will also possess a pulsed flow. For this reason, the plenum 500 is advantageous to provide intake air for the engine 100 with a relatively constant high pressure.

For the in-line type engines 700, 800 (FIGS. 12 and 13, respectively), exhaust gas flowing from the engine 100 is pulsed (i.e. has a cyclical pressure peak frequency) due to the firing sequence of the cylinders. Consequently, the pressurized air generated by the turbocharger 300 will possess a pulsed flow corresponding to the ignition sequence of the respective engine. As with the V-twin engine discussed above, the plenum 500 is advantageous to provide intake air for the respective engine at a relatively constant high pressure.

Figure 14:
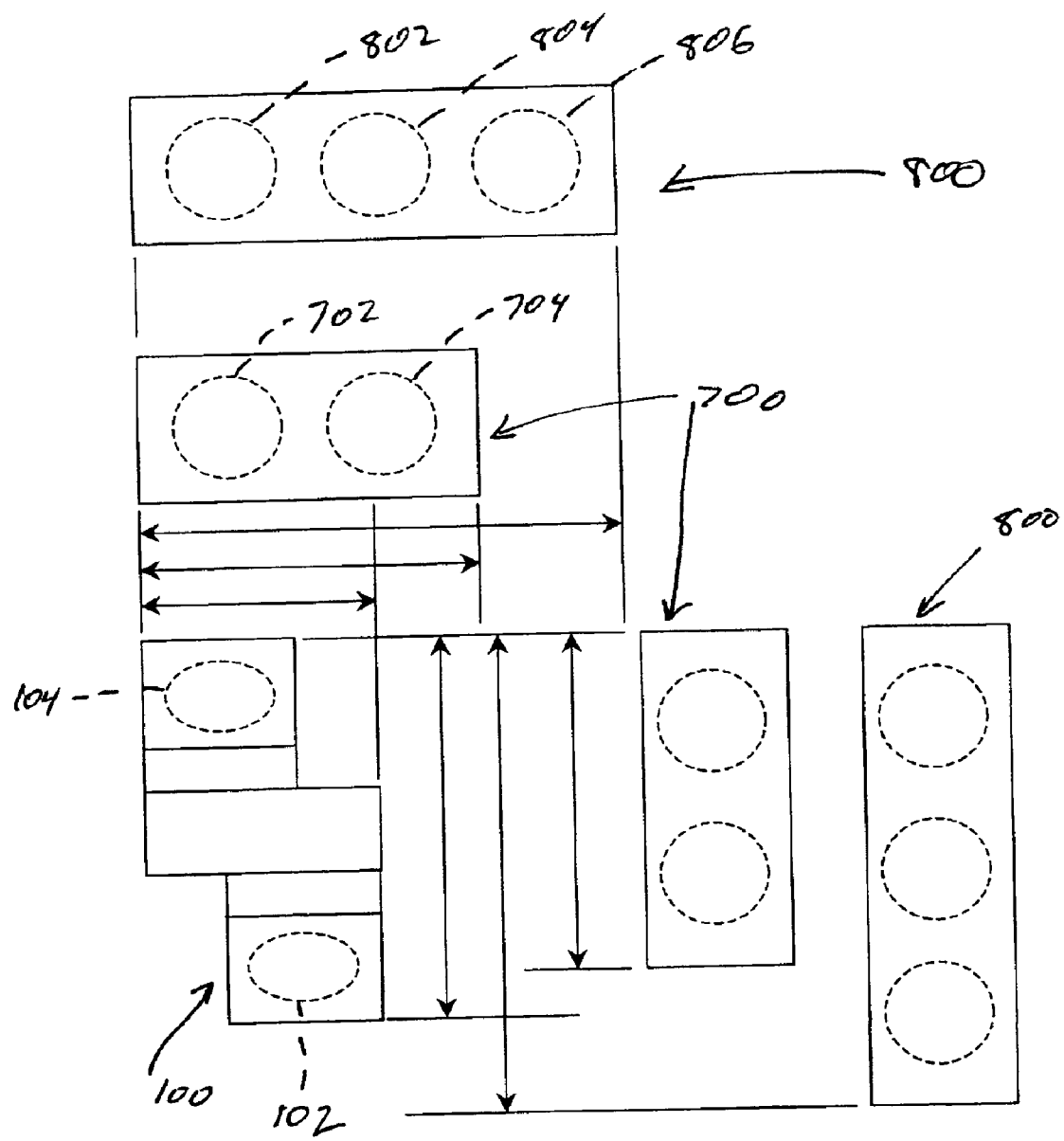
FIG. 14 is a schematic view of a V-twin engine, two cylinder in-line engine, and a three cylinder in-line engine with relative dimensions indicated.

Selection of a particular type of engine discussed herein may be based on space limitations within the snowmobile 10. FIG. 14 is a plan view of the V-twin engine 100, two cylinder engine 700, and three cylinder engine 800. Depending on the specific power requirements and space limitations of a snowmobile 10, any one of these engines may be utilized with the snowmobile. As shown, the width of the two and three cylinder engines 700, 800 is relatively narrower than that of the V-twin engine 100. However, the length of the V-twin engine 100 is relatively less than either of the two or three cylinder engines 700, 800.

It is noted that the present invention is advantageous in the art of snowmobiles for providing a powerful four-stroke engine that produces relatively fewer hydrocarbon emissions than the prior two-stroke counterparts. It is also noted that due to the previously disadvantageous characteristics of four-stroke engines, with respect to implementation thereof with snowmobiles, the present invention has been unpracticed in the art.

Figure 15:
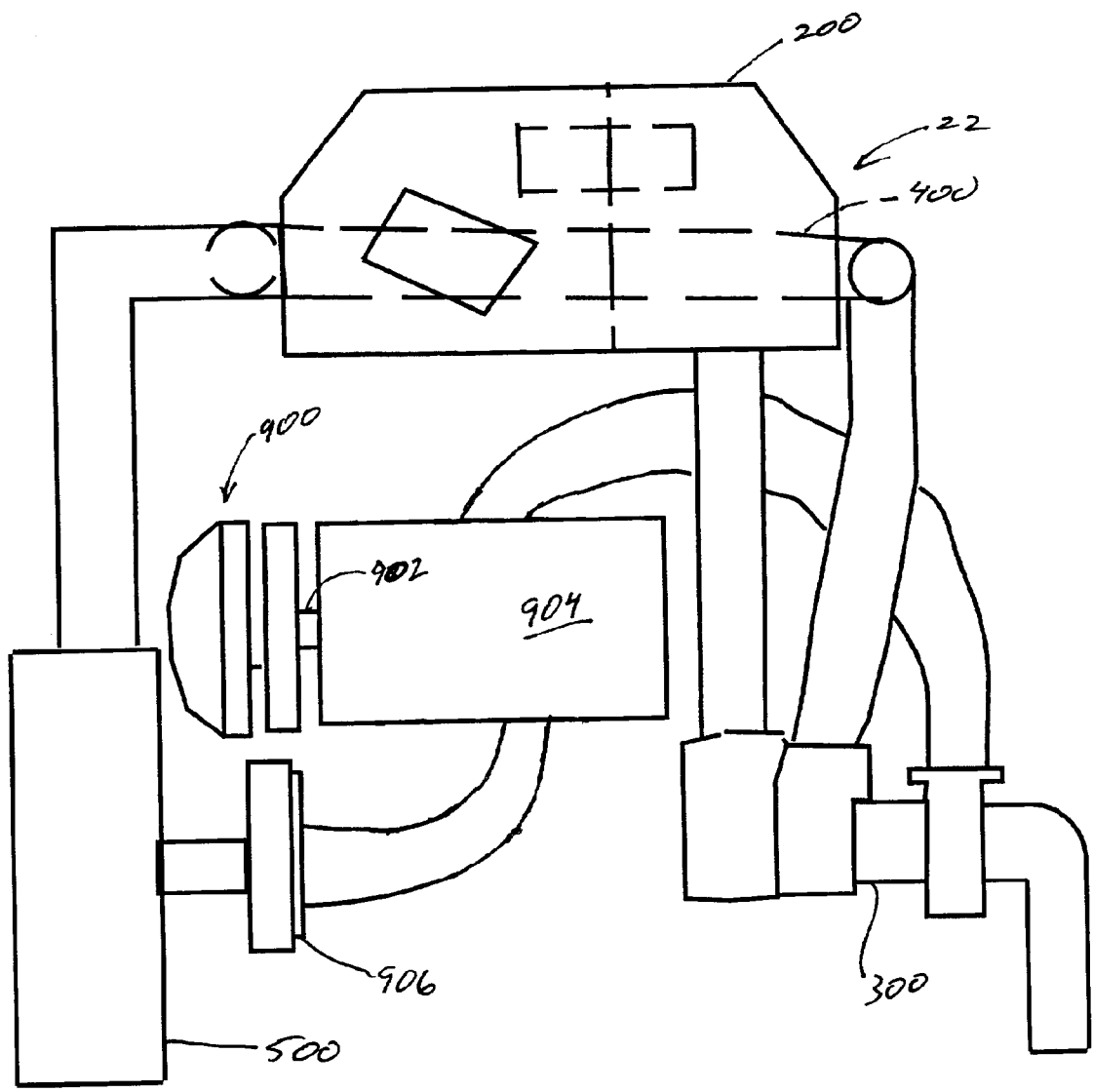
FIGS. 15 and 16 are schematic views of an engine with a CVT in different arrangements.

Furthermore, with respect to the turbocharger 300, previous use of a turbocharger has been unfeasible in a snowmobile due to turbo lag, described above, during rapid throttle advancement. Consequent to the nature of snowmobiles and the environment they are operated in, rapid throttle advancement is a common occurrence in normal and severe operating conditions. This can result in turbo lag in a turbocharged engine. However, the use of a continuously-variable-transmission (CVT) in the snowmobile, as is well known in the art, can help reduce or prevent turbo lag. For example, it is noted that the turbocharger 300 may deliver pressurized air to the engine 100 for engine speeds below 3000 RPM, and at 3000 RPM, pressurizes intake air at an effective and useable level. The CVT may be configured to delay driving engagement until about 3000 RPM, therefore, the turbocharger is already effectively pressurizing the engine by the time the CVT begins driving engagement. Thus this relatively high engine RPM prior to driving engagement of the CVT helps to minimize turbo lag. No turbo lag has been noticed in a snowmobile tested with the turbocharged engine as described herein. FIG. 15, schematically shows a CVT 900 operatively connected to a crankshaft 902 of an engine 904. It is noted that engine 904 may be of any type discussed herein, such as the V-twin type, two cylinder type, of three cylinder type. Of course, it is contemplated that different engine sizes, turbocharger configurations, snowmobile sizes, and CVT configurations may be suited for higher or lower RPM at which point the snowmobile initially moves. It is noted that 3000 RPM is recited for example only and is not meant to be limiting.

Figure 16:
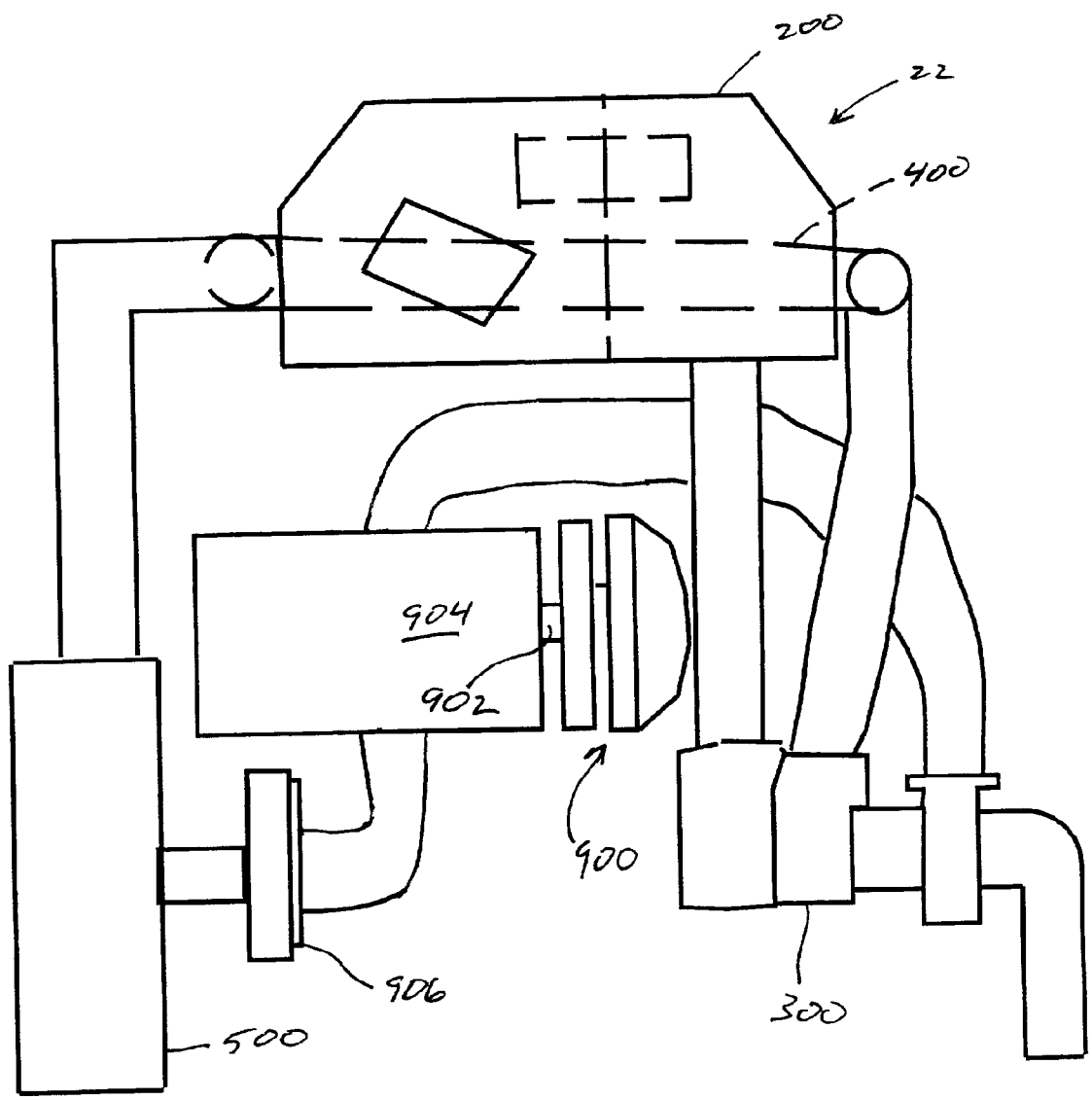

Additionally, the CVT, engine, and turbocharger (as well as any other components discussed herein) may be arranged so as to maximize available space within the snowmobile 10. For example, FIG. 15 shows the CVT 900 disposed on a side of the engine 904 opposite the turbocharger 300. Conversely, FIG. 16 shows the CVT 900 disposed on a side of the engine 904 adjacent the turbocharger 300. Any other accommodating arrangement is, of course, possible. Additionally, FIG. 15 shows an engine air intake, indicated at 906, arranged at the side of the engine 904 adjacent the CVT 900 and opposite the turbocharger 300. Conversely, FIG. 16 shows the engine air intake 906 arranged at the side of the engine 904 opposite the turbocharger 300, while the CVT 900 is disposed adjacent the turbocharger 300 and opposite the intake 906. Specifically, FIG. 15 shows the CVT 900 and intake 906 disposed on a port side of the engine 904, while the turbocharger 300 is disposed on a starboard side of the engine 904. Furthermore, FIG. 16 shows the CVT 900 and turbocharger 300 disposed on the starboard side of the engine 904, while the intake is disposed on the port side of the engine 904. Similarly, the plenum 500 maybe disposed on either side of the engine 904. Furthermore, although the turbocharger is shown on the air inlet side of the engine in FIGS. 15 and 16, it should be appreciated that the turbocharger may be provided on the exhaust outlet side of the engine. In addition, the turbocharger may be positioned on either the port or starboard side of the engine.

As shown in FIG. 3, the turbine outlet 314 is connected to the exhaust system 24. The exhaust system 24 preferably includes heat-resistant piping and a muffler (shown in FIG. 2 at 300A) through which exhaust gases from the engine exit the snowmobile 10, via the turbocharger 300.

It will be appreciated that numerous modifications to and departures from the embodiments of the invention described above will occur to those having skill in the art. Such further embodiments are deemed to be within the scope of the following claims.

What is claimed is:

1. A snowmobile, comprising:
   a frame having a forward portion and a rear portion;
   a turbocharged four-stroke engine mounted to said forward portion of said frame;
   an endless belt drive system mounted to said rear portion of said frame and operatively connected to said engine;
   an air intake system for said engine; and
   a continuously-variable-transmission operatively coupled between said engine and said belt drive system and being manipulable into an engaged configuration wherein said continuously-variable-transmission transfers sufficient power between said engine and said endless drive belt to effect movement of said snowmobile.

2. A snowmobile as in claim 1, wherein said engine includes at least one cylinder, each cylinder having a respective combustion chamber, said engine having an air inlet capable of communicating with each said combustion chamber and an exhaust outlet capable of communicating with each said combustion chambers;
   said air intake system comprising;
   an air passage communicated with the atmosphere, said air passage being a substantially hollow enclosed structure, wherein said turbocharger is connected to said air passage such that air from said air passage may enter said turbocharger, said turbocharger communicating with said exhaust outlet and being constructed and arranged such that a flow of exhaust gases from said exhaust outlet through said turbocharger affects a pressurization of air therein.

3. A snowmobile as in claim 2, further comprising a heat exchanger formed of a heat conductive material connected to said turbocharger such that the pressurized air from said turbocharger may enter therein, said heat exchanger being constructed and arranged such that heat from the pressurized air is dissipated therefrom to the atmosphere via said heat conductive material.

4. A snowmobile as in claim 3, further comprising a plenum connected to said heat exchanger such that air from said heat exchanger may enter said plenum, said plenum further connected to said air inlet and being constructed and arranged such that cyclically pressurized amplitude of the air from said turbocharger via said heat exchanger may collect therein such that the pressurization amplitude of the air upon exiting the plenum and entering said air inlet is substantially constant.

5. A snowmobile as in claim 2, wherein said air passage is positioned forward of said engine in spaced relation thereto in order to prevent significant heating of air within said air passage.

6. A snowmobile as in claim 2, wherein said air passage is positioned aft of said engine in spaced relation thereto in order to prevent significant heating of air within said air passage.

7. A snowmobile as in claim 3, wherein said heat exchanger is an intercooler, said intercooler inducing an intake portion and an outlet portion, said intake and outlet portions connected by a series of spaced hollow conduits.

8. A snowmobile as in claim 7, wherein said intercooler is positioned proximate said forward portion of said frame, said intercooler being arranged generally normally to the oncoming air flow from the atmosphere produced by movement of said snowmobile therethrough, such that said conduits are directly exposed to the oncoming air.

9. A snowmobile as in claim 7, wherein said intercooler is positioned proximate said forward portion of said frame, said intercooler being arranged generally parallel to the oncoming air flow from the atmosphere produced by movement of said snowmobile therethrough, said intercooler being positioned such that the air is directed across one surface thereof, thereby entraining air from an opposite side through spaces between said conduits.

10. A snowmobile as in claim 7, wherein said intercooler is positioned proximate said forward portion of said frame, said intercooler being arranged at an angle to the oncoming air flow from the atmosphere produced by movement of said snowmobile therethrough, said intercooler being positioned such that the air is directed across one surface thereof, thereby entraining air from an opposite side through spaces between said conduits.

11. A snowmobile as in claim 3, wherein said air passage communicates with said turbocharger via a first duct member and said turbocharger communicates with said heat exchanger via a second duct member.

12. A snowmobile as in claim 4, wherein said heat exchanger communicates with said plenum via a duct member, said duct member being formed of one of a polymer material and a metallic material.

13. A snowmobile as in claim 4, wherein said plenum is connected to said air inlet on one end thereof.

14. A snowmobile as in claim 4, wherein said plenum has an internal volume between and including 3 and 5 liters.

15. A snowmobile as in claim 2, wherein said snowmobile further comprises un exhaust system, said exhaust system being operatively connected to said turbocharger such that exhaust gas may flow from said turbocharger subsequent to said affecting the pressurization of air from the environment and through said exhaust system into the atmosphere.

16. A snowmobile as in claim 15, wherein said exhaust system includes a muffler to dissipate noise of the exhaust gas exiting said engine.

17. A snowmobile as in claim 2, wherein said air inlet is provided by a throttle body.

18. A snowmobile as in claim 2, wherein said turbocharger pressurizes the air at a sufficiently useable level for engine speeds below 3000 revolutions per minute.

19. A snowmobile as in claim 1, wherein said continuously-variable-transmission is operatively connected to said engine on a side thereof opposite a side thereof that is proximate said turbocharger.

20. A snowmobile as in claim 1, wherein said continuously-variable-transmission is operatively connected to said engine on a side thereof adjacent a side thereof that is proximate said turbocharger.

21. A snowmobile as in claim 1, wherein said continuously-variable-transmission is configured such that the movement of said snowmobile is effected when said engine is operating at 3000 revolutions per minute.

22. A snowmobile as in claim 1, wherein said turbocharger pressurizes the air prior to engagement of said continuously-variable-transmission.

23. A snowmobile as in claim 1, wherein said engine is of a V-twin two cylinder type engine.

24. A snowmobile as in claim 1, wherein said engine includes a plurality of cylinders and is an in-line type engine.

25. A snowmobile as in claim 1, wherein said turbocharger is disposed on a starboard side of said engine.

26. A snowmobile as in claim 1, wherein said turbocharger is disposed on a port side of said engine.

27. A snowmobile as in claim 4, wherein said plenum and said continuously-variable-transmission are disposed on a same side of said engine.

28. A snowmobile as in claim 4, wherein said plenum and said continuously-variable-transmission are disposed on opposites sides of said engine relative to one another.

29. A snowmobile as in claim 4, wherein said plenum and said turbocharger are disposed on opposite sides of said engine relative to one another.

* * * * *